June 30, 1964  J. F. HUTTO ETAL  3,139,407
ADDITION OF SOLIDS TO HIGH VAPOR PRESSURE LIQUID
Filed April 7, 1961
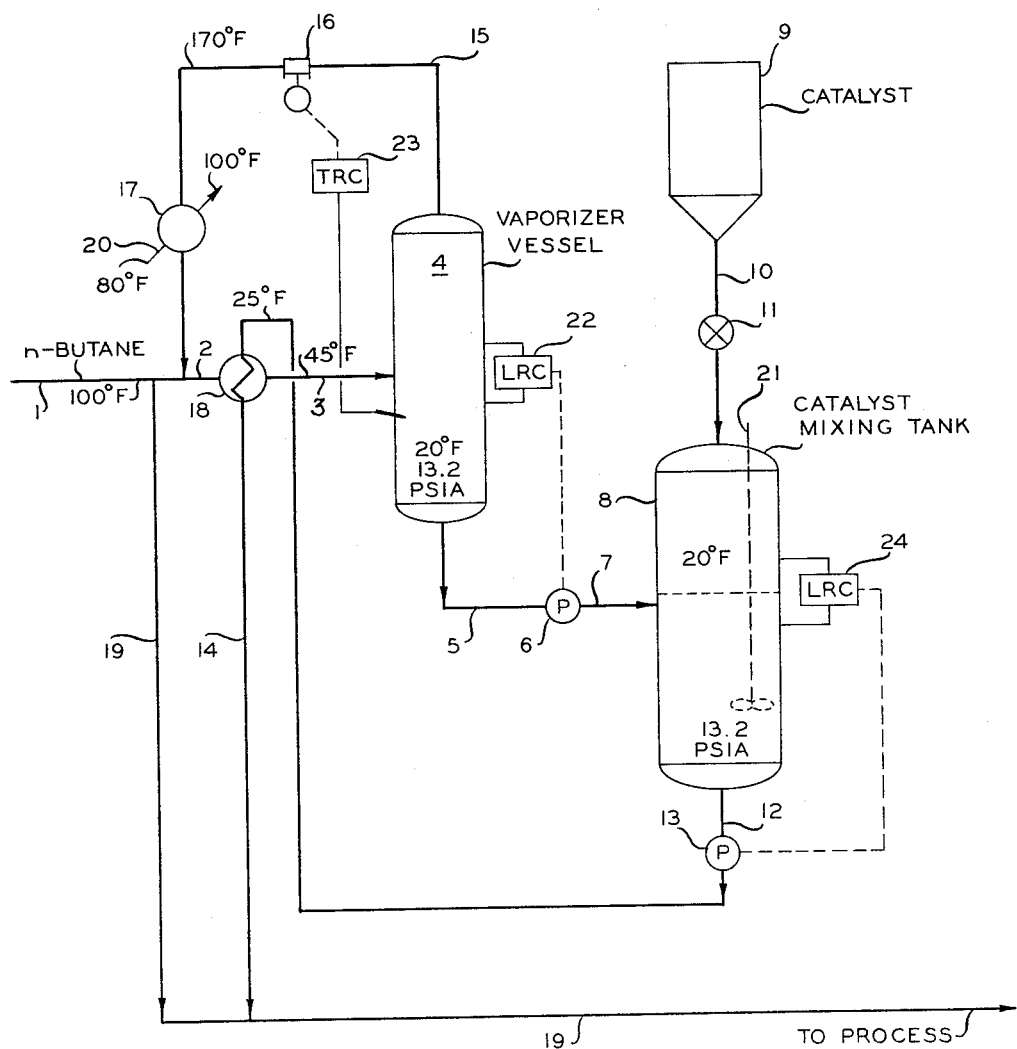
INVENTORS
J. F. HUTTO
K. E. WALKER
BY Hudson and Young
ATTORNEYS

United States Patent Office 3,139,407
Patented June 30, 1964

3,139,407
ADDITION OF SOLIDS TO HIGH VAPOR
PRESSURE LIQUID
John F. Hutto and Kenneth E. Walker, Bartlesville, Okla.,
assignors to Phillips Petroleum Company, a corporation of Delaware
Filed Apr. 7, 1961, Ser. No. 101,564
8 Claims. (Cl. 252—429)

This invention relates to the production of a slurry of a finely divided or subdivided solid material in a liquid. In one aspect it relates to the production of a slurry of a finely divided catalytic material in a liquid the vapor pressure of which is higher than atmospheric pressure at atmospheric temperature.

The production of slurries of finely divided solid materials with liquids which have vapor pressures less than atmospheric pressures at atmospheric temperatures is a relatively simple operation. Catalysts which are sensitive to oxygen are prepared many times in the presence of an inert material such as nitrogen or the like. Catalysts which are sensitive to the presence of moisture are also slurried with liquids in the presence of a dry or anhydrous inert material which also can be dry nitrogen gas. Other gases or inert materials can be used in such operations providing they meet the requirements of the particular case.

However, in the aluminum chloride isomerization of butane, for example, a different problem exists in the preparation of an aluminum chloride-butane slurry for use in the operation. This different condition is the consideration that butane has a normal boiling point of around 31.1° F. Such a material obviously boils below ordinary atmospheric temperature in an open vessel. Obviously, it is not desirable to make such a slurry in an open vessel because of the loss of vapors from the boiling butane during the actual production of the slurry. Furthermore, when making aluminum chloride slurries with butane or a similar hydrocarbon, atmospheric or other moisture should be excluded from the operation.

An object of this invention is to provide a process for the production of a slurry of a finely divided catalystic material in a liquid which possesses a vapor pressure greater than atmospheric pressure at atmospheric temperature. Another object of this invention is to provide a process for the production of a slurry of catalytic aluminum chloride with a liquid hydrocarbon which possesses a vapor pressure greater than atmospheric at ordinary ambient atmospheric temperature. Still another object of this invention is to provide a process for the production of an aluminum chloride-butane slurry for use in the aluminum chloride isomerization of normal butane. Other objects and advantages of this invention will be realized upon reading the following description which, taken with the attached drawing, forms a part of this specification.

According to this invention, when producing slurries of aluminum chloride with hydrocarbons of the boiling range of the butanes, we refrigerate the butane to a temperature at which the vapor pressure is atmospheric pressure or preferably below atmospheric pressure and at this low temperature and pressure the catalyst is added in the slurry producing operation. By judicious use of heat exchangers we are able to refrigerate the butane to the required temperature and vapor pressure with a minimum of apparatus and at a minimum of cost.

On reference to the drawing, a normal butane feed material, such as that employed in the aluminum chloride isomerization of normal butane to isobutane, enters this system through a conduit 1. The major portion of this feed butane passes through a conduit 19 to the isomerization process. A small portion of this normal butane feed stream is separated from the main stream and flows through conduits 2 and 3 into a vaporizer vessel 4. Feed material passing through conduit 2 is cooled or chilled in a heat exchanger 18 by the slurry product of this operation as subsequently described. In vaporizer vessel 4 butane is vaporized under the action of a compressor 16 which draws vapor through a conduit 15. This compressor 16 compresses the withdrawn vapor to such a pressure that plant cooling water condenses the butane in a condenser 17. The plant cooling water passes through the condenser in conduit 20. Condenser 17 is an indirect heat exchange type condenser and condensate therefrom passes on and is added to the small stream of feed normal butane in conduit 2. Thus, the combined stream of butane material is chilled in heat exchanger 18 prior to passage through conduit 3 into the vaporizer vessel 4. Heat exchanger 18 is an indirect heat exchanger.

Butane vaporizing in vessel 4 cools the remaining butane and this cooled butane at a predetermined temperature and vapor pressure leaves the vessel 4 through a conduit 5 and is transferred by a pump 6 through a conduit 7 into a catalyst mixing tank 8. Catalyst aluminum chloride from feeder tank 9 is passed through a conduit 10 and is metered by a star valve 11 from which the catalyst passes into the mixing tank 8. Mixing tank 8 is provided with a stirrer 21 which thoroughly mixes the added aluminum chloride with the chilled liquid butane in the tank. The slurry is then passed from tank 8 through a conduit 12 under the influence of a pump 13 for use in the heat exchanger 18. From this exchanger the final product slurry is passed through a conduit 14 and is added to the main stream of feed normal butane for passage to the isomerization process.

A level recorder-controller apparatus 22 operates in conjunction with pump 6 to regulate flow of chilled butane to the mixing vessel. The exact level at which the liquid in tank 4 is maintained is more or less immaterial but sufficient liquid should be maintained in the tank for operation of the temperature recorder-controller 23. This recorder-controller operates in response to a temperature sensing device, such as a thermocouple, in tank 4 and controls compressor 16 for proper withdrawal of butane vapor from the tank for maintenance of proper tank temperature. A level recorder-controller 24 is also provided in conjunction with mixing tank 8 for the maintenance of a proper volume of liquid in the tank to obtain proper operation of stirrer 21 for the production of a suitable slurry. The level recorder-controllers 22 and 24 need not be recording controllers but they can be if desired. Practically any industrial control equipment supply house supplies such level recorder-controllers as would be suitable in the operation of this invention. A suitable level controller is one advertised in the Foxboro Catalogue M–58–4 and manufactured by the Foxboro Corporation, Foxboro, Massachusetts. The temperature controller 23 also can be a recording controller if desired or it need not be a recording controller. However, such a temperature recording controller is manufactured by the Foxboro Company, Foxboro, Massachusetts, and is described in their catalogues as Model M–40.

Catalytic aluminum chloride is frequently marketed in flexible moisture-proof bags and it is intended herein that catalyst vessel 9 contain one of these bags properly opened for passage of the aluminum chloride through conduit 10.

In the following tabulation are given process data illustrating the flow of materials in process as herein disclosed. For example, of the total normal butane feed in pipe 1 which, in one instance, involves 6,505 barrels butane per stream day, 587 barrels per stream day are by-passed from feed conduit 1 through conduit 2 into the apparatus of this invention. Pure normal butane has a normal boiling point of approximately 31.1° F. but since the normal butane plane feed stock contains other materials than normal butane such a feed stock actually has a small temperature boiling range. Such a feed stock in some instances may have a boiling range of about 28° to 33° F. In order to make certain that the material in vaporizer vessel 4 has a vapor pressure less than atmospheric pressure at several thousand feet elevation, we maintain a pressure in vessel 4 of about 13.2 or less pounds per square inch absolute. This vapor pressure corresponds to a temperature of about 20° F. In this case upon withdrawal of about 47 standard cubic feet per minute of vapor from vessel 4, the remaining liquid contents of the tank are maintained at about the proper vapor pressure and temperature. This withdrawn vapor is compressed in compressor 16 and emerges therefrom at a temperature of about 170° F. at a pressure of about 56 p.s.i.a. This compressed vapor is condensed in condenser 17 which receives plant cooling water at a temperature of about 80° F. and emerges at about 100° F. The condensed materials or condensate is passed on into conduit 2 and is mixed therewith the portion of the feed stream from conduit 1 which is by-passed for entry into tank 4. In heat exchanger 18 slurry from tank 8 at about 25° F. is indirectly heat exchanged with this combined condensate and feed butane and cools this combined material from about 100° F. to about 45° F. At this latter temperature the butane material enters the vaporizer vessel 4. The exit temperature of the slurry from heat exchanger 18 is more or less immaterial because it is combined with the main portion of feed butane and the combined slurry and feed butane are passed on to the isomerization process, not shown. Since, ordinarily, tanks 4 and 8 are relatively close together and the intervening piping and the tanks are well insulated, there is little or substantially no temperature increase on passage of the liquid from vaporizer vessel 4 into the mixing tank 8. Thus, the temperature and pressure in mixing tank 8 are approximately the same as those maintained in the vaporizer vessel.

Catalytic aluminum chloride is added from a Seald Bin bag in tank 9 through conduit 10 containing star valve 11 to the liquid in tank 8 and the mixer or stirrer 21 provides agitation for the production of the desired slurry. In the example given herein 1,770 pounds of aluminum chloride per stream day are passed through star valve 11 into the mixing tank 8. There are also 587 barrels of feed normal butane passed into this tank. From these two figures calculation shows that 1.23 pounds of aluminum chloride are added per 17.6 gallons of liquid butane. These quantities are the quantities which enter tank 8 per minute. Since the weight of aluminum chloride catalyst added is so small in comparison to the 17.6 gallons of liquid, the temperature of the catalyst added is more or less immaterial. There is thus substantially no temperature rise on addition of the catalyst to the liquid butane.

For condensation of the 47 standard cubic feet per minute of vapor after compression by compressor 16 in heat exchanger 17, about 78,000 B.t.u. of cooling per hour are supplied from the plant cooling water. As mentioned above, this cooling water is warmed from about 80° F. to about 100° F.

In heat exchanger 18 there is recovered about 140,000 B.t.u. per hour when using the produced slurry at a temperature of about 25° F. as coolant. This quantity of heat for cooling per hour reduces the temperature of the mixture of condensate and feed normal butane from about 100° to approximately 45° F. prior to entry of the combined liquids into the vaporizer vessel 4.

While we have described the operation of our invention relative to the addition of make-up aluminum chloride catalyst to a portion of the feed butane in a butane isomerization system, this invention has considerably broader uses. It has special application for the production of a slurry of finely divided solid material with any liquid which possesses a vapor pressure higher than atmospheric pressure at normal atmospheric temperature. For example, since normal pentane has a normal boiling point of about 96.9° F., aluminum chloride catalyst could be added to this liquid according to the present invention because with the boiling point of 96.9° F. on hot summer days the vapor pressure of the normal pentane would be greater than atmospheric pressure at atmospheric temperature. The invention can also be used in the production of a slurry of catalyst with liquid propylene for use in the catalytic reaction of propylene in the production of diisopropyl.

The above referred to tabulation illustrating material in process is as follows:

| Stream No. | 1 | 3 | 15 | 5 | 14 | 20 | 10 |
|---|---|---|---|---|---|---|---|
| Bbl./s.d.: | | | | | | | |
| i-C$_4$ | 149 | 16 | | 16 | 16 | | |
| n-C$_4$ | 6,238 | 560 | | 560 | 560 | | |
| C$_5$+ | 118 | 11 | | 11 | 11 | | |
| Vapor, M s.c.f. | | | 47 | | | | |
| Cooling Water, b./s.d. | | | | | | 274 | |
| AlCl$_3$, lbs./s.d. | | | | | | | 1,770 |
| Totals, b./s.d. | 6,505 | 587 | 47 | 587 | 587 | 274 | 1,770 |

While this invention was described relative to the use of aluminum chloride as a catalyst, other catalytic materials such as silica-gel, silica alumina catalyst, or other finely divided materials can be slurried with a liquid whose vapor pressure is greater than atmospheric pressure at atmospheric temperature.

This invention can also be used in adding catalyst to one or more reactants used in an alkylation operation. This latter could involve addition of AlCl$_3$ to isobutane, isopentane, propylene, butylene or other alkylation reactants having a vapor pressure higher than atmospheric pressure.

While certain embodiments of the invention have been described for illustrative purposes, the invention obviously is not limited thereto.

We claim:
1. A method for preparing a slurry of particulate solids with a liquid having a vapor pressure greater than atmospheric pressure at ambient atmospheric temperature which comprises the steps of:
   (1) maintaining a mass of said liquid in an enclosed vaporizing zone;
   (2) withdrawing vapor from said zone so as to vaporize liquid from said mass and lower the temperature of said mass at least to that at which the vapor pressure of the liquid in said mass is not above the vapor pressure of ambient atmosphere; and
   (3) gravitating said particulate solids directly into an enclosed mass of the liquid existing at conditions effected by step (2) to produce said slurry.
2. The method of claim 1 including the steps of:
   (4) compressing the vapor withdrawn in step (2);
   (5) cooling the compressed vapor from step (4); and
   (6) returning the cooled and compressed vapor of step (5) to said zone.
3. The method of claim 1 wherein liquid from step (2) substantially at conditions of temperature and pressure effected thereby is passed to an enclosed mixing zone and said particulate solids are fed by gravity thereto and mixed with said liquid therein.
4. The method of claim 1 wherein said liquid is a low boiling hydrocarbon and said solid is aluminum chloride.
5. The method of claim 4 wherein said hydrocarbon is n-butane.
6. The process of claim 1 wherein the temperature in said vaporizing zone is sensed and the rate of withdrawal of vapor in step (2) is controlled in response thereto so as to maintain a predetermined temperature in said zone.

7. The process of claim 6 wherein the temperature of the liquid in said zone is the sensed temperature.

8. A method for preparing a slurry of solid particulate material in a liquid having a vapor pressure greater than atmospheric pressure at ambient atmospheric temperature which comprises the steps of:
   (1) maintaining a mass of said liquid in an enclosed vaporizing zone at a pressure not more than atmospheric pressure by pumping vapor of said liquid from said zone, thereby cooling remaining liquid and causing further evaporation thereof at reduced pressure;
   (2) cooling compressed fluid from step (1);
   (3) admixing cooled fluid of step (2) with a fresh stream of said liquid;
   (4) cooling the mixture of step (3);
   (5) passing the cooled mixture of step (4) into said vaporizing zone as the feed thereto; and
   (6) gravitating said solid material directly into an enclosed mass of the liquid existing at the conditions effected in said zone at less than ambient atmospheric pressure and temperature to form said slurry.

References Cited in the file of this patent

UNITED STATES PATENTS

| | | |
|---|---|---|
| 2,353,098 | Whiteley et al. | July 4, 1944 |
| 3,002,038 | Lucchesi | Sept. 26, 1961 |
| 3,055,958 | Webb | Sept. 25, 1962 |

FOREIGN PATENTS

| | | |
|---|---|---|
| 119,125 | Australia | Oct. 23, 1944 |